(12) United States Patent
Ikeda et al.

(10) Patent No.: US 11,679,739 B2
(45) Date of Patent: *Jun. 20, 2023

(54) START SWITCH DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Yo Ikeda, Aichi (JP); Tomoyuki Funayama, Aichi (JP); Yuya Goto, Aichi-ken (JP); Naoyuki Takada, Aichi-ken (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 16 days.

This patent is subject to a terminal disclaimer.

(21) Appl. No.: 17/477,241

(22) Filed: Sep. 16, 2021

(65) Prior Publication Data

US 2022/0001837 A1    Jan. 6, 2022

Related U.S. Application Data

(63) Continuation of application No. 16/721,545, filed on Dec. 19, 2019, now Pat. No. 11,161,478, which is a (Continued)

(30) Foreign Application Priority Data

Oct. 13, 2017    (JP) .............................. JP2017-199100

(51) Int. Cl.
*B60R 25/25*  (2013.01)
*B60R 25/24*  (2013.01)
(Continued)

(52) U.S. Cl.
CPC ............ *B60R 25/252* (2013.01); *B60K 35/00* (2013.01); *B60K 37/06* (2013.01); *B60R 25/06* (2013.01);
(Continued)

(58) Field of Classification Search
CPC .... G06F 21/83; G06V 40/1359; G06V 40/67; B60K 37/06
See application file for complete search history.

(56) References Cited

U.S. PATENT DOCUMENTS 6,041,410 A      3/2000  Hsu
6,100,811 A *    8/2000  Hsu ..................... B60R 25/2081
                                              340/426.36
(Continued)

FOREIGN PATENT DOCUMENTS

CN      102903555 A    1/2013
CN      204368284 U    6/2015
(Continued)

OTHER PUBLICATIONS

Office Action issued in related Chinese Patent Application No. 201810818617.2 dated Aug. 2, 2021.
(Continued)

*Primary Examiner* — Yosef Kassa
(74) *Attorney, Agent, or Firm* — Thomas W. Cole; Calderon Safran & Cole P.C.

(57) ABSTRACT

A start switch device includes a start button configured to send a command to start or stop a vehicle drive device, a biometric sensor arranged on the start button for reading a biometric information of an operator to operate an operating surface of the start button, a light source configured to emit an illuminating light from an inside of the start button toward the operating surface, and a design part arranged around the biometric sensor on the operating surface and
(Continued)

configured to define a design on the operating surface by the illuminating light transmitted therethrough.

9 Claims, 2 Drawing Sheets

Related U.S. Application Data continuation of application No. 15/950,798, filed on Apr. 11, 2018, now Pat. No. 10,518,749.

(51) Int. Cl.
| | |
|---|---|
| *B60K 35/00* | (2006.01) |
| *G06F 21/32* | (2013.01) |
| *F02N 11/08* | (2006.01) |
| *B60K 37/06* | (2006.01) |
| *G06F 21/83* | (2013.01) |
| *B60R 25/06* | (2006.01) |
| *B60R 25/31* | (2013.01) |
| *G06V 40/60* | (2022.01) |
| *G06V 40/12* | (2022.01) |

(52) U.S. Cl.
CPC ............. *B60R 25/24* (2013.01); *B60R 25/31* (2013.01); *F02N 11/0803* (2013.01); *G06F 21/32* (2013.01); *G06F 21/83* (2013.01); *B60K 2370/128* (2019.05); *B60K 2370/34* (2019.05); *B60K 2370/741* (2019.05); *G06V 40/1359* (2022.01); *G06V 40/67* (2022.01)

(56) References Cited

U.S. PATENT DOCUMENTS

| | | |
|---|---|---|
| 6,373,148 B1 | 4/2002 | Daiss |
| 6,614,920 B2 | 9/2003 | Floyd |
| 6,710,700 B1 | 3/2004 | Tatsukawa |
| 6,912,299 B1 | 6/2005 | Hoshino |
| 6,970,584 B2 | 11/2005 | O'Gorman |
| 7,138,904 B1 * | 11/2006 | Dutu ................. B60R 25/102 340/5.82 |
| 7,266,266 B2 | 9/2007 | Matsumoto |
| 7,424,618 B2 | 9/2008 | Roy |
| 7,555,150 B2 | 6/2009 | Ikeda |
| 8,103,402 B2 | 1/2012 | Kozlay |
| 8,264,320 B2 | 9/2012 | Nelson |
| 8,306,595 B2 | 11/2012 | Osaki et al. |
| 8,330,637 B2 | 12/2012 | Lee |
| 8,547,356 B2 | 10/2013 | Maloney |
| 8,972,299 B2 | 3/2015 | Kelley |
| 9,002,586 B2 | 4/2015 | Feit |
| 9,002,986 B2 | 4/2015 | Chatenay |
| 9,043,048 B2 | 5/2015 | Manotas, Jr. |
| 9,663,112 B2 * | 5/2017 | Abou-Nasr ........... B60W 40/08 |
| 10,146,924 B2 * | 12/2018 | Corcoran ................ G06F 21/32 |
| 2010/0125187 A1 | 5/2010 | Osaki et al. |

FOREIGN PATENT DOCUMENTS

| | | |
|---|---|---|
| CN | 205131198 U | 4/2016 |
| CN | 205854042 U | 1/2017 |
| EP | 2058197 A1 | 5/2009 |
| JP | 08-087588 A | 4/1996 |
| JP | 2009-166750 A | 7/2009 |
| JP | 2009-208724 A | 9/2009 |
| JP | 2010-121961 A | 6/2010 |
| JP | 2012-079662 A | 4/2012 |
| JP | 2013088760 A | 5/2013 |
| JP | 2014-207196 A | 10/2014 |
| KR | 20100040115 A | 4/2010 |
| KR | 20120097013 A | 9/2012 |
| WO | 2010041783 A1 | 4/2010 |

OTHER PUBLICATIONS

Office Action issued in related European Patent Application No. 18167535.6 dated Nov. 2, 2021.

Extended European Search Report issued in corresponding European Application No. 18167535.6 dated Dec. 5, 2018.

\* cited by examiner

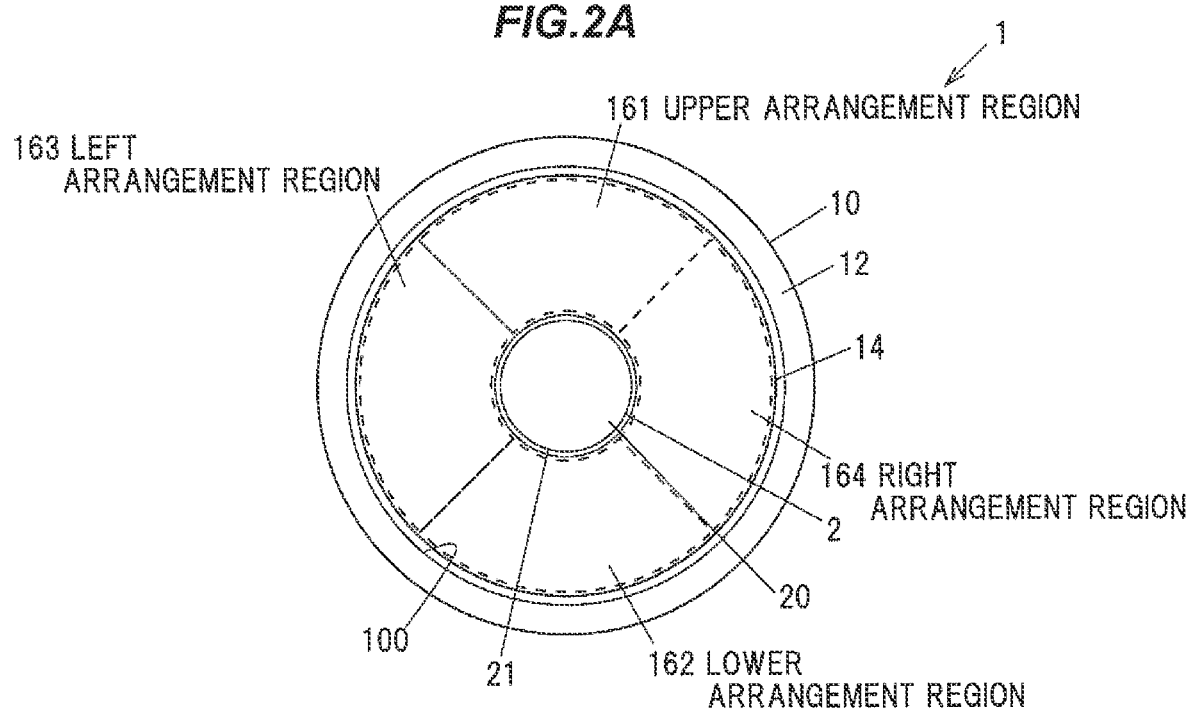
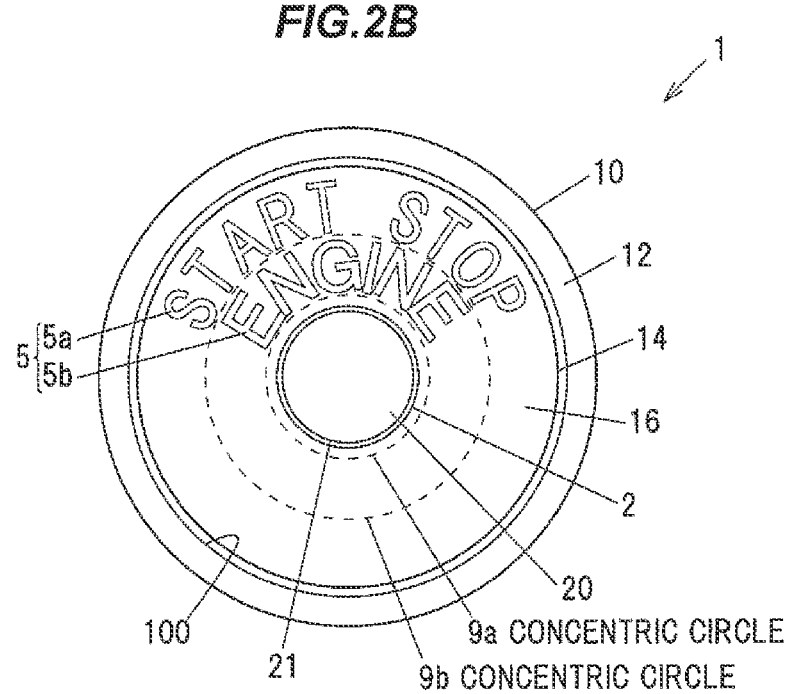

START SWITCH DEVICE

BACKGROUND OF THE INVENTION

1. Field of the Invention

This invention relates to a start switch device.

2. Description of the Related Art

A vehicle indoor lighting device is known which is comprised of a push engine start switch button with an indicating light for starting or stopping an engine, and a controller to control the indicating light (see e.g., JP 2009/166750 A).

The controller of the vehicle indoor lighting device operates such that the indicating light of the push engine start switch button is turned on with a light source color and a predetermined brightness for a predetermined time, and then the indicating light is reduced in brightness of the light source color and blinked with time.

SUMMARY OF THE INVENTION

Where a biometric sensor for reading a biometric information of an operator is provided in a surface of the push engine start switch button of the vehicle indoor lighting device, the biometric sensor may be difficult to illuminate since it is not likely to transmit light. Thus, the biometric sensor may be difficult to identify at night.

It is an object of the invention to provide a start switch device that can improve the identifiability of the biometric sensor at night.

According to an embodiment of the invention, a start switch device comprises:

a start button configured to send a command to start or stop a vehicle drive device;

a biometric sensor arranged on the start button for reading a biometric information of an operator to operate an operating surface of the start button;

a light source configured to emit an illuminating light from an inside of the start button toward the operating surface; and a design part arranged around the biometric sensor on the operating surface and configured to define a design on the operating surface by the illuminating light transmitted therethrough.

According to an embodiment of the invention, a start switch device can be provided that can improve the identifiability of the biometric sensor at night.

BRIEF DESCRIPTION OF THE DRAWINGS

Next, the present invention will be explained in conjunction with appended drawings, wherein:

FIG. 2A is a schematic view explaining an example of arrangement region of design part of the start switch device according to the embodiment; and FIG. 2B is a schematic view showing an arrangement example of design part according to the variation.

DETAILED DESCRIPTION OF THE PREFERRED EMBODIMENTS

Summary of Embodiments

A start switch device according to the embodiment is substantially provided with a start button operated to indicate a vehicle drive device to start or stop, a biometric sensor reading biometric information of an operator operating an operating surface of the start button, which is provided on a start button, a light source emitting illuminating light from inside the start button toward the operating surface, and a design part arranged at the operating surface around the biometric sensor defining a design on the operating surface by transmitting illuminating light.

The start switch device can improve identifiability of the biometric sensor at night compared with a device not having such structure since the design is arranged around the biometric sensor and is shone by the illuminating light.

Embodiments (Structure of the Start Switch Device 1)

Figure 1A:
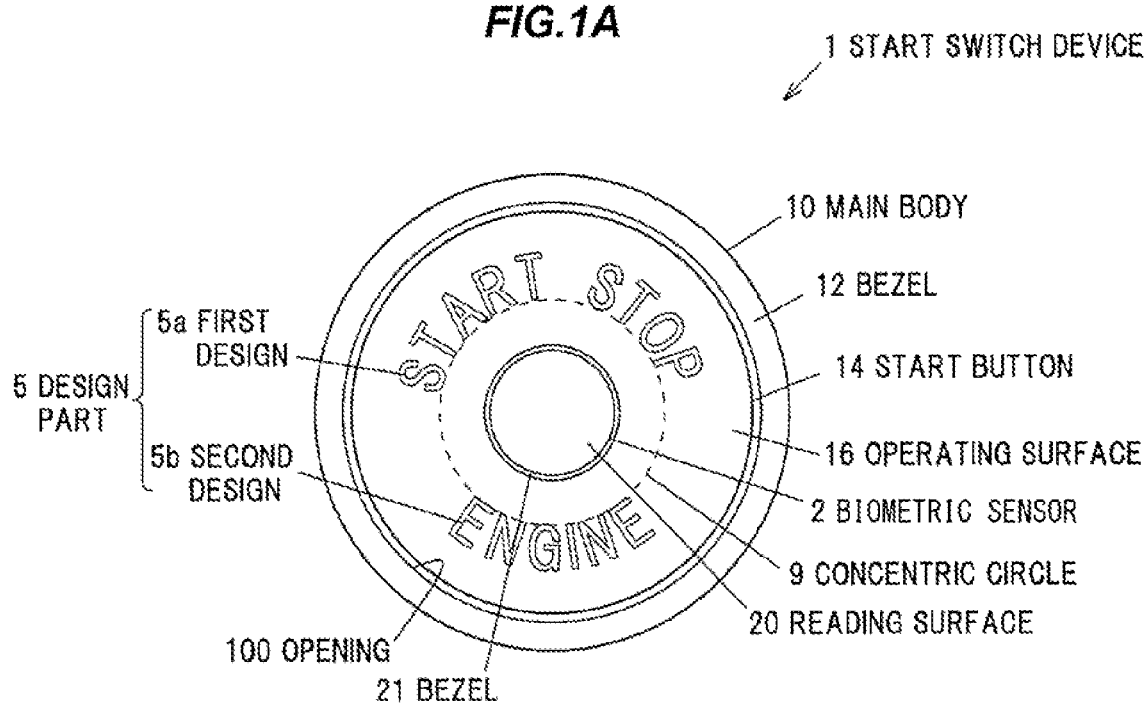
FIG. 1A is a schematic view showing an example of start switch device according to the embodiment.
Figure 1B:
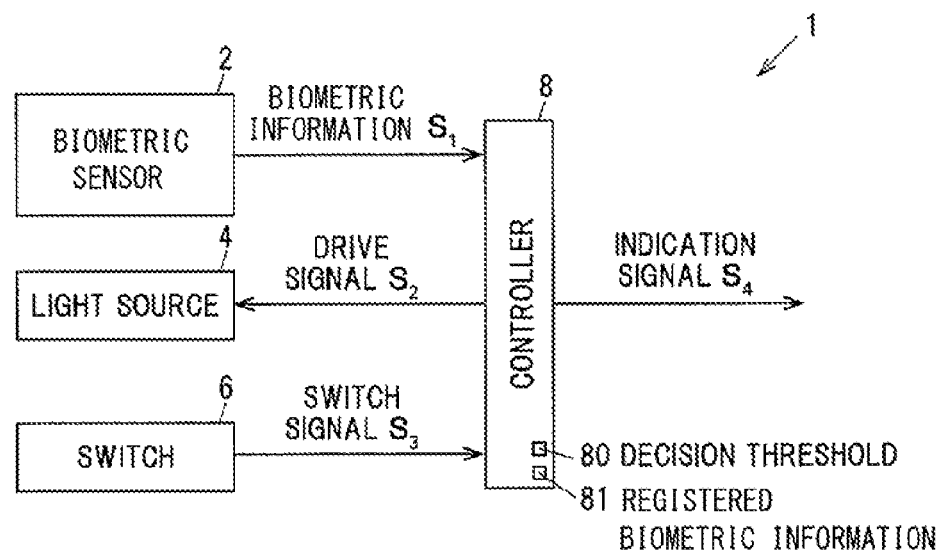
FIG. 1B is a block diagram showing an example of the start switch device.

FIG. 1A is a schematic view showing an example of start switch device according to the embodiment. FIG. 1B is a block diagram showing an example of the start switch device. FIG. 2A is a schematic view explaining an example of arrangement region of design part of the start switch device according to the embodiment. FIG. 2B is a schematic view showing an arrangement example of design part according to the variation. Ratio between FIGS may be different from the actual ratio in each figure according to the embodiment described below. FIG. 1B shows flow of main signal or information by arrows.

As shown in FIGS. 1A, 1B, for example, the start switch device 1 is substantially provided with the start button 14 operated to indicate a vehicle drive device to start or stop, the biometric sensor 2 reading the biometric information of the operator operating the operating surface 16 of the start button 14, which is provided on the start button 14, the light source 4 emitting the illuminating light from inside the start button 14 toward the operating surface 16, and the design part 5 arranged at the operating surface 16 around the biometric sensor 2 defining the design on the operating surface 16 by transmitting the illuminating light.

As an example, drive voltage is supplied to the start switch device 1 from a vehicle battery after opening a door lock by identification based on radio communication performed by electrical key etc. Then, the start switch device 1 can read the biometric information by the biometric sensor 2. The design part 5 is illuminated by the light source 4 in the same time.

Then, the vehicle starts the drive device when the vehicle turns the switch 6 of the start switch device 1 into the on state by operation, and the biometric information is recognized.

For example, the drive device is an engine, a motor, or combination of these devices. The start switch device 1 is configured to instruct the drive device to start or stop.

For example, the designs according to the embodiment are a first design 5a and a second design 5b as shown in FIG. 1A.

(Structure of the Start Button 14)

For example, the start button 14 is arranged at an opening 100 of the main body 10 as shown in FIG. 1A. A bezel 12 is provided on the main body 10. The operating surface 16 of the start button 14 has a circular shape in top view and a curved surface sinking in a mortar shape in the center of the bezel 12 in side view. For example, the start switch device 1 has a columnar shape.

The start button 14 is configured such that can operate push operation. The switch 6 is provided on the start switch device 1 to face to an opposite end of the operating surface 16 of the start button 14.

The switch 6 is configured to turn into the on state by contacting with the start button 14 by the push operation by the switch button 14 and turn into the off state by returning the start button 14 and releasing the contact.

For example, the switch 6 outputs a switch signal $S_3$ to the controller 8 in the on state. The controller 8 determines that the start button 14 is operated based on the input of the switch signal $S_3$.

(Structure of the Biometric Sensor 2)

The biometric sensor 2 is arranged at the center of the operating surface 16 of the start button 14. The biometric sensor 2 has a circular reading surface 20 reading the biometric information. The biometric sensor 2 is exposed at the operating surface 16. For example, the reading surface 20 is arranged lower than the operating surface 16. In other words, for example, the reading surface 20 is exposed at a position such as a bottom of the mortar formed in the operating surface 16.

The biometric sensor 2 is configured to read the biometric information of an operation finger contacting with the operating surface 16. For example, the biometric information includes information about at least one of a fingerprint pattern or a vein pattern of the operational finger.

For example, the biometric sensor 2 is substantially provided with sensors such as an optical sensor, a capacitance sensor, an electric field intensity measuring sensor, a pressure sensitive sensor, and a thermal sensor when the biometric sensor 2 reads the fingerprint pattern.

For example, the biometric sensor 2 is substantially configured to read the vein pattern based on emitted near infrared reflection when the biometric sensor 2 reads the vein pattern.

As an example, the biometric sensor 2 according to the embodiment is the capacitance sensor reading the fingerprint pattern.

The bezel 21 surrounding the reading surface 20 is provided on the biometric sensor 20. As an example, the bezel 21 is formed in a ring shape by using metal material. The bezel 21 indicates a border between the operating surface 16 and the reading surface 20.

(Structure of the Light Source 4)

For example, the light source 4 is substantially provided with a light emitting element (Light Emitting Diode: LED). The light emitting element may be arranged under the biometric sensor 2 and guided to the design part 5 by a light guide. The light emitting element may be arranged under the design part 5 and illuminates the design part 5 directly or through the light guide.

For example, the light source 4 is emitted by a drive signal $S_2$ output from the controller 8 as shown in FIG. 1B.

(Structure of the Design Part 5)

For example, the design part 5 is substantially provided with a first design 5a and a second design 5b. For example, when forming the start button 14 comprising transparent resin such as polycarbonate and forming a black non-transparent coating on the operating surface 16 of the start button 14, the design part 5 is formed by partially removing the coating by laser etc.

The start button 14 and the design part 5 may be formed by two color molding. Alternatively, the design part 5 may be formed by defining through holes in the operating surface 16 of design part 5 and then inserting a transparent resin into the through holes.

For example, the design of the design part 5 has character shapes as shown in FIG. 1A. As an example, the characters "START STOP" are designed as the first design 5a. As an example, the characters "ENGINE" are designed as the second design 5b. Meanwhile, the design part 5 is not limited to the characters. The design part 5 may be a figure or combination of the figure and the character.

For example, the first design 5a in the design part 5 is provided to be opposite to the second design 5b across the biometric sensor 2 as shown in FIG. 1A. For example, the operating surface 16 can be divided into an upper arrangement region 161, a lower arrangement region 162, a left arrangement region 163, and a right arrangement 164 across the biometric sensor 2 with the dotted line as shown in FIG. 2A. The shapes of the upper arrangement region 161, the lower arrangement region 162, the left arrangement region 163, and the right arrangement region 164 shown in FIG. 2A are an example divided equally. The shapes deform based on a number of characters, a kind of character, a size of character etc.

When the design part 5 is designed in two-stages, the design part 5 is arranged at the upper arrangement region 161 and the lower arrangement region 162, or at the left arrangement region 163 and the right arrangement region 164 so as to be opposite across the biometric sensor 2. In the switch device 1 shown in FIG. 1A, the first design 5a is arranged at the upper arrangement region 161 and the second design 5b is arranged at the lower arrangement region 162.

For example, the first design 5a and the second design 5b of the design part 5 are desirably arranged along a concentric circle 9 of the reading surface 20 as shown in FIG. 1A. The design part 5 is recognized as a circular shape by arranging the design part 5 along the concentric circle 9. The operator can easily recognize that he should operate the biometric sensor 2 (i.e., the reading surface 20) at the center of the circle. Thus, the biometric sensor 2 can recognize the position of the reading surface 20 indirectly when the biometric sensor 2 is not illuminated.

As the variation, for example, the design part 5 may be designed as two lines as shown in FIG. 2B. In the variation, the characters "START STOP" and the characters "ENGINE" are arranged at the upper arrangement region 161 along the different concentric circles 9a, 9b respectively. Meanwhile, the design part 5 may be arranged at the other arrangement region or may not be arranged along concentric circle.

While the design part 5 has two stages, the operator is easy to recognize that the reading surface 20 of the biometric sensor 2 is located at the center of the concentric circles 9a, 9b by arranging the design part 5 along the concentric circles 9a, 9b.

As the other variation, for example, the design part 5 may be arranged such that the characters "START STOP ENGINE" surround the biometric sensor 2 along one concentric circle. That is, the design part 5 may be arranged continuously.

(Structure of the Controller 8)

For example, the controller 8 is a microcomputer comprising a Central Processing Unit (CPU) computing and editing obtained data based on a memorized program, and a Random Access Memory (RAM) and a Read Only Memory (ROM) that are semiconductor memories. For example, the ROM mounts a program to operate the controller 8, a decision threshold 80, and registered biometric information 81. For example, the RAM is used as a memory area temporarily mounting the computing result.

As an example, the controller 8 determines the operator is registered when similarity between a fingerprint pattern minutia of the operator based on the biometric information $S_1$ obtained from the biometric sensor 2 and a fingerprint pattern minutia of the registrant registered in the registered biometric information 81 is higher than the decision threshold 80.

The controller 8 obtains the switch signal $S_3$ output from the switch 6 based on the push operation to the start button 14, and the biometric information $S_1$ output from the biometric sensor 2. Then, the controller 8 produces an indication signal $S_4$ to indicate the drive device to start when the switch 6 is turned into the on state and the controller 8 determines the operator is registered based on the biometric information $S_1$.

(Advantageous Effects of the Invention)

The start switch device 1 according to the embodiment can improve identifiability of the biometric sensor 2 at night. Specifically, since the illuminated design part 5 is provided on the circumference of the biometric sensor 2 of the start switch device 1, the position of the reading surface 20 of the biometric sensor 2 can be recognized by the operator at night by using as a target compared with a device of which the design part is not illuminated. Therefore, the start switch device 1 can improve the identifiability of the biometric sensor 2 at night.

Since the design part 5 is arranged along the concentric circle 9 of which the center is similar with the center of the reading surface 20 of the biometric sensor 2, the operator can recognize the characters as like a circular outer line compared with a device that does not have such structure. Therefore, the operator can recognize the biometric sensor 2 arranged at the center at night.

Since the first design 5a is arranged to be opposite to the second design 5b across the biometric sensor 2, the position of the biometric sensor 2 is easy to be recognized as the space between the illuminated first design 5a and the illuminated second design 5b at night compared with the device that does not have such structure.

Since the start switch device 1 can improve the identifiability of the biometric sensor 2 by the illumination to the design part 5, the light emitting element for the biometric sensor 2 etc., is unnecessary compared with a structure comprising the light emitting element illuminating the biometric sensor, the profile can be downsized. The start switch device 1 can decrease a number of parts and control manufacturing cost since the light emitting element illuminating the biometric sensor 2 etc., is unnecessary.

Where the biometric sensor 2 is illuminated by the illuminating light output through a gap between the reading surface 20 of the biometric sensor 2 and the operating surface 16, the start switch device 1 is needed to be sealed to prevent the penetration of a liquid to inside. Due to the seal, the start switch device 1 may increase the size of the device or the manufacturing cost since the arrangement spaces of the light emitting element for the biometric sensor 2 and the light guide are insufficient. However, the start switch device 1 according to the embodiment allows the reading surface 20 of the biometric sensor 2 to be easily identified by the arrangement of the illuminated design part 5. Thus, the start switch device 1 is easy to downsize and therefore the manufacturing cost can be reduced.

Although the embodiments and the variations of the invention have been described, the embodiments and the variations are just examples and the invention according to claims is not to be limited to the above-mentioned embodiment and the above-mentioned variations. Further, please note that all combinations of the features described in the embodiments and the variations are not necessary to solve the problem of the invention. Replacements, omits, modifications, etc., can be suitably implemented without departing from the gist of the invention. Also, all combinations of the features described in the embodiments and the variations are not necessary to solve the problems of the invention. Further, the accompanying claims and their equivalents are intended to cover such forms or modifications as would fall within the scope and spirit of the inventions.

The invention claimed is:

1. A switch device, comprising:
    a button configured to send a command to conduct a predetermined control of a vehicle and having an operating surface;
    a fingerprint sensor arranged on the button and configured to read a fingerprint pattern of an operator when a finger of the operator is on the operating surface of the button;
    a button design part arranged around the fingerprint sensor on the operating surface; and
    a light source configured to illuminate the button design part before reading the fingerprint pattern.

2. The switch device according to claim 1, wherein a design of the button design part comprises characters around the fingerprint sensor.

3. The switch device according to claim 1, wherein a design of the button design part comprises a plurality of character shapes which are opposite to each other across the fingerprint sensor.

4. The switch device according to claim 1, wherein the fingerprint sensor comprises a circular reading surface to put the finger thereon and to be exposed in the operating surface, and
    wherein a design of the button design part is arranged along a concentric circle of the reading surface.

5. The switch device according to claim 1, wherein the fingerprint sensor comprises a circular reading surface to put the finger thereon, and
    wherein an entire periphery of the reading surface is encompassed by the operating surface.

6. The switch device according to claim 5, wherein the reading surface is formed circular, and
    wherein a design of the button design part is arranged along a concentric circle of the reading surface.

7. The switch device according to claim 5, wherein the reading surface is recessed from the operating surface.

8. The switch device according to claim 5, wherein a bezel to exhibits a boundary between the reading surface and the operating surface is arranged between the reading surface and the operating surface.

9. The switch device according to claim 1, wherein the button design part is arranged along a circle encompassing the fingerprint sensor.

* * * * *